Nov. 12, 1957    H. BACHMANN    2,812,905
SLIDE RULES
Filed May 17, 1954
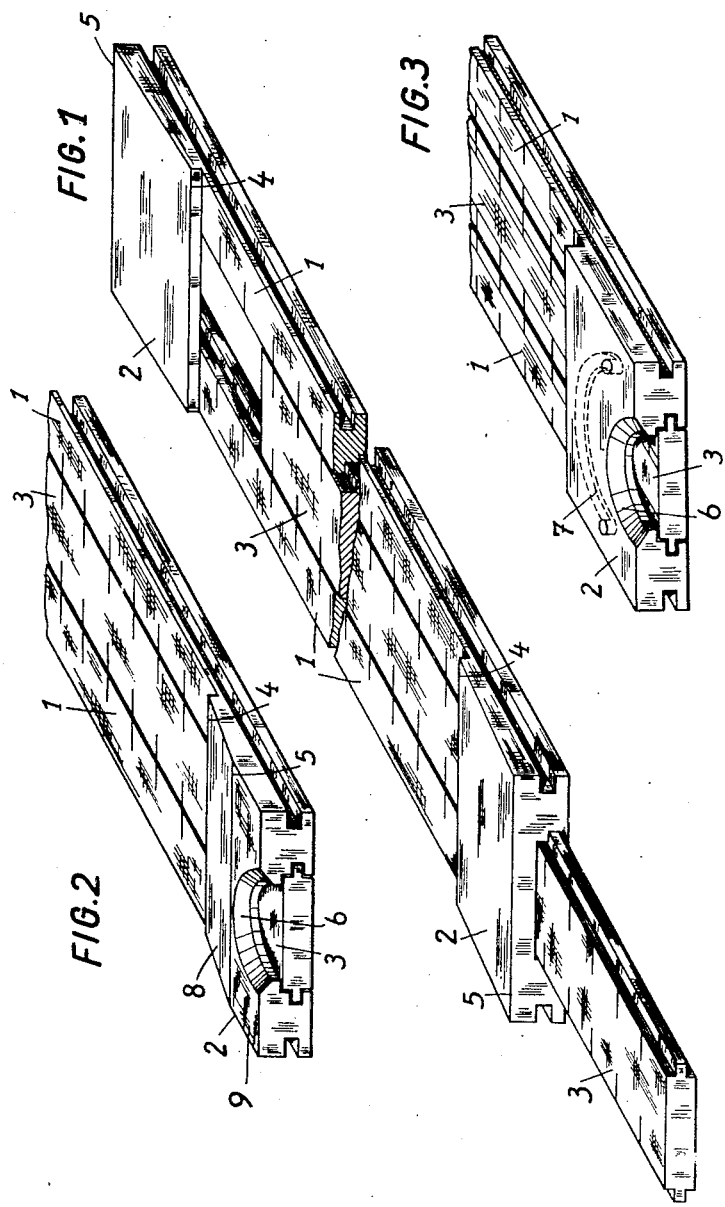
INVENTOR
H. Bachmann
ATTYS.

United States Patent Office 2,812,905
Patented Nov. 12, 1957

2,812,905

SLIDE RULES

Harald Bachmann, Stein, near Nurnberg, Germany, assignor to A. W. Faber-Castell, Stein, near Nurnberg, Germany, a German firm Application May 17, 1954, Serial No. 430,309

Claims priority, application Germany June 17, 1953

5 Claims. (Cl. 235—70)

The present invention relates to improvements in slide rules and more particularly to slide rules of the type which permit calculations to be carried out on both sides thereof.

Slide rules of this type as previously designed have the disadvantage that the two side frames thereof originally consist of two separate elements which are then secured together by special braces, cross bars, or the like, which are either glued or cemented thereto or fastened thereon by screws or rivets. When fitting the slide into such side frames, the indications thereon usually show considerable variations or discrepancies which render the slide rule useless unless corrected. Such correction is usually performed by providing special adjusting means, for example, for shifting the side frames relative to each other in longitudinal direction thereof. Being made of several parts, even if correctly adjusted when sold, such instruments are also liable to get out of adjustment when in use, and such faulty adjustment, if not immediately realized and corrected, may result in erroneous calculations and untold damage caused thereby. Also, the cost of manufacture and assembly of such slide rules consisting of numerous individual parts is very high, thus increasing the purchase price and decreasing the saleability of such instruments, and preventing many people who would have ready use for them from purchasing them.

It is the object of the present invention to provide a slide rule which overcomes all the above mentioned disadvantages of prior designs, which can be easily and cheaply produced and sold at a very low price, and the accuracy of which is inherent in the instrument which thus does not have to be adjusted or readjusted either during its manufacture or while in use.

More specifically, it is an object of the invention to design a slide rule, the two side frames of which are integral with each other and formed of a single piece of material, thus avoiding the expense of assembling and adjusting various parts relative to each other as required in slide rules of prior design, and thus obtaining an instrument the accuracy of which will remain undiminished during its entire life.

An essential feature of the invention resides in molding or die-casting the two sides or frames of the slide rule of a single piece of thermoplastic material.

Another feature of the invention consists in integrally securing the opposite frame parts to each other by means of cross bars which are molded or die-cast together with the frame parts so as to connect the same, and which preferably are provided on one side of the slide rule only.

Another feature of the invention consists in molding the cross bars so as to connect the opposite frame parts with a certain inwardly directed spring action so as to guide the slide resiliently and securely at all times.

Another feature of the invention resides in utilizing the characteristic of thermoplastic materials of producing internal tensions of different strength in accordance with the difference in thickness of the material. Thus, when molding or die-casting thermoplastic materials, the thinner portions cool more quickly than the thicker ones and thereby have a slight tendency to curl. When making the two cross bars at the opposite ends of the slide rule of a wedgelike shape, increasing in thickness toward their outer ends, the inner, thinner ends when cooling tend to curl and to draw the adjacent frame parts toward each other so as to exert a certain resilient friction upon the slide which is just sufficient to restrain it from sliding too freely without, however, binding the same, although still retaining the slide securely in any adjusted position.

Another feature of a modified form of the invention for attaining an effect similar to the one described resides in providing metallic springs of a suitable shape within the cross bars which integrally connect the outer frame parts to each other. These springs, which may be applied either in place of the wedgelike shape of the cross bars or in addition thereto, likewise have the tendency of drawing the outer frame parts resiliently toward each other, and have the advantage that, by giving these springs a predetermined initial tension, the tension of the outer frame parts and the friction exerted thereby upon the slide may likewise be predetermined.

An additional feature of the invention is to provide suitable recesses or apertures in the opposite outer edges of the cross bars of the slide rule so as to permit the slide to be easily withdrawn from its initial or zero position.

Further objects, features, and advantages of the present invention will be apparent from the following detailed description thereof and the accompanying drawings, in which—

Fig. 1 shows a perspective view of the slide rule according to the invention;

Fig. 2 shows the finger recess on a cross bar similarly as shown in Fig. 1, while Fig. 3 shows a modification of the invention with a cross bar containing a spring.

Referring to the drawings, and particularly to Figs. 1 and 2, the two outer frame parts 1 of the slide rule and the cross bars 2 connecting the same are formed of a single piece of thermoplastic material and are produced by molding or diecasting. The frame 1 and the slide 3 are provided in the conventional manner with corresponding tongues and grooves for guiding the slide 3 for movement within the frame parts 1 in a longitudinal direction thereof. Each of the cross bars 2 is preferably designed according to the invention so as to act like a spring which tends to draw the outer frame parts 1 inwardly toward each other so as to press laterally and resiliently upon the slide 3 at a force sufficient to restrain the slide from sliding too freely but without binding it in any fixed position. By providing a suitable mold in which the entire frame unit 1, 2 is cast under heat and pressure so that the connecting bars 2 gradually decrease in thickness from their thickest portion 5 toward their inner end 4, different inner tensions are produced in the opposite parts 4 and 5 of these bars. Whereas, when cooling after being molded or die-cast, the solid portion 5 will retain its straight shape, the wedgelike portion 8 will have the tendency to bend or curl inwardly, and such tendency gradually increases as the thickness of the portion 8 decreases toward the inner edge 4. Such tendency to bend or curl being automatically transmitted to the adjacent frame parts 1 below the cross bars 2, in turn, creates the tendency of these frame portions 1 to draw together and to exert a friction upon the slide and the tongue-and-groove connection between these inner and outer elements of the slide rule. On the other hand, that portion of the wedgelike part 8 where the inner tension is the greatest also being the thinnest and thus the most resilient portion, a type of resiliency is produced by such molding operation which can hardly be duplicated by mechanical means, and one which has been found especially suitable for the proper operation of an instrument of this type. Such resiliency of the entire frame unit, the tendency of the outer frame parts 1 to be drawn together, and the friction thus exerted upon the slide 3 may be modified according to the specific requirements of the slide, and the length and width thereof, by varying the length, thickness, or angularity of the wedgelike part 8. Thus, as shown in Fig. 2, the wedgelike part 8 may be made of shorter length and extended beyond the point of its maximum thickness to form an outer portion 9 of equal thickness in which, if desired, a recess 6 of fingertip-like shape may be provided which permits the slide 3 to be grasped at its outer ends even when in the neutral or zero position for withdrawing and adjusting the same with ease.

In place of the wedgelike shape of the cross bars 2 as previously described, the same may also be made of equal thickness throughout its length, as shown in Fig. 3. For attaining the required tension, a spring 7 of suitable shape and strength may be embedded in the cross bar 2 so as to draw the two side parts 1 together and into resilient contact with the slide 3. If desired, the features of the invention as shown in Fig. 3 may also be combined with those shown in Figs. 1 and 2. This may be applicable particularly in a case where the spring action of the wedgelike part 8 alone may not be sufficient to provide adequate friction between the two elements 1 and 3 of the slide rule and where, for example, for the reason of a more pleasing appearance, the wedgelike part 8 should not be made too thick. In such event, the spring 7 may be embedded in the cross bar 2 to act as a reinforcement thereof both of its material strength and solidity as well as its spring action for drawing the frame parts 1 toward each other. The provision of such embedded spring 7 in either of the embodiments shown has the advantage that the spring action, and thus the friction of the frame parts 1 upon the slide 3, may be more accurately preadjusted in the factory by giving the spring 7 a certain initial tension the strength of which may be adjusted in accordance with the friction desired.

While the foregoing description sets forth in detail what I regard as the preferred embodiments of my invention, it is to be understood that numerous changes may be made therein without departing from the spirit and scope of the invention as defined in the appended claims.

Having thus described my invention, what I claim as new is:

1. A slide rule comprising an outer frame of plastic material and a slide element, said frame and slide element having corresponding projections and grooves for guiding said slide element within said frame in longitudinal direction thereof, said frame comprising two outer parts and a pair of cross bars resiliently connecting said outer parts at each end thereof and being molded together therewith so as to form a single piece of material, said cross bars being of wedgelike shape with the thinner part thereof directed inwardly of said slide rule, said cross bars exerting a spring action upon said outer parts to draw them toward each other and into resilient contact with said slide, said spring action gradually increasing in strength as said wedge like bars decrease in thickness.

2. A slide rule as claimed in claim 1, in which said cross bars are provided with recesses at the opposed outer ends of said slide rule whereby said slide may be manipulated at the outer ends thereof when fully inserted within said frame.

3. A slide rule comprising an outer frame of plastic material and a slide element, said frame and slide element having corresponding projections and grooves for guiding said slide element within said frame in longitudinal direction thereof, said frame comprising two outer parts and a pair of cross bars resiliently connecting said outer parts at each end thereof and being molded together therewith so as to form a single piece of material, and metallic spring inserts embedded within said cross bars and tending to draw said outer parts toward each other and into resilient contact with said slide.

4. A slide rule comprising an outer frame of plastic material and a slide element, said frame and slide element having corresponding projections and grooves for guiding said slide element within said frame in longitudinal direction thereof, said frame comprising two outer parts and a pair of cross bars resiliently connecting said outer parts at each end thereof and being molded together therewith so as to form a single piece of material, and a pre-tensioned spring embedded within each of said cross bars and tending to draw said outer parts toward each other and into resilient contact with said slide.

5. A slide rule comprising an outer frame of plastic material and a slide element, said frame and slide element having corresponding projections and grooves for guiding said slide element within said frame in longitudinal direction thereof, said frame comprising two outer parts and a pair of cross bars resiliently connecting said outer parts at each end thereof and being molded together therewith so as to form a single piece of material, said cross bars being of wedgelike shape with the thinner part thereof directed inwardly of said slide rule, said cross bars exerting a spring action upon said outer parts to draw them toward each other and into resilient contact with said slide, said spring action gradually increasing in strength as said wedgelike bars decrease in thickness, and a metalic spring insert embedded within said bars for increasing the spring action of said wedgelike bars.

References Cited in the file of this patent

UNITED STATES PATENTS 520,114     Johnson _____ May 22, 1894

FOREIGN PATENTS 602,802     Great Britain _____ June 3, 1948